Figure 1:
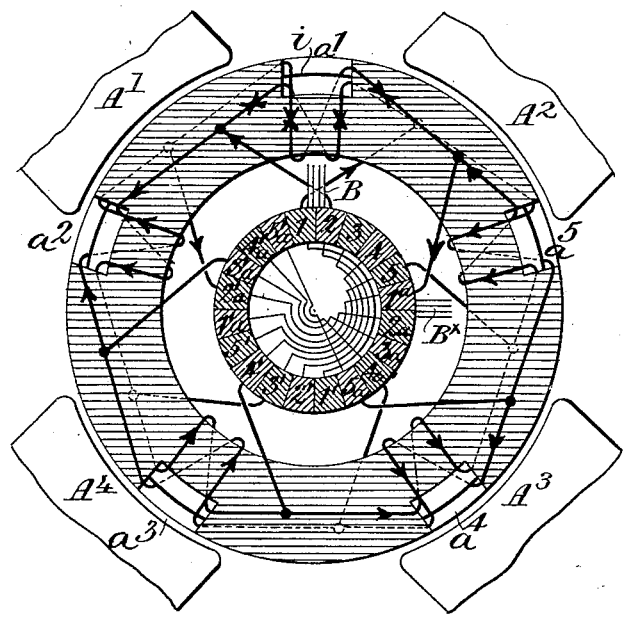

(No Model.) 4 Sheets—Sheet 1.
H. CHITTY.
ARMATURE FOR ELECTRIC MOTORS AND DYNAMO ELECTRIC MACHINES.
No. 546,996. Patented Oct. 1, 1895.

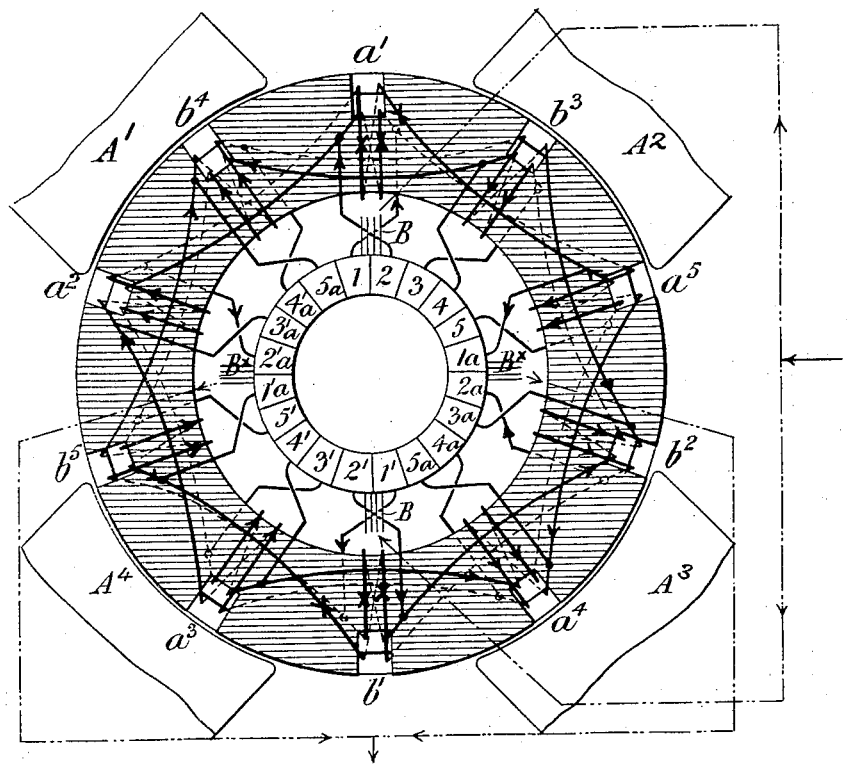
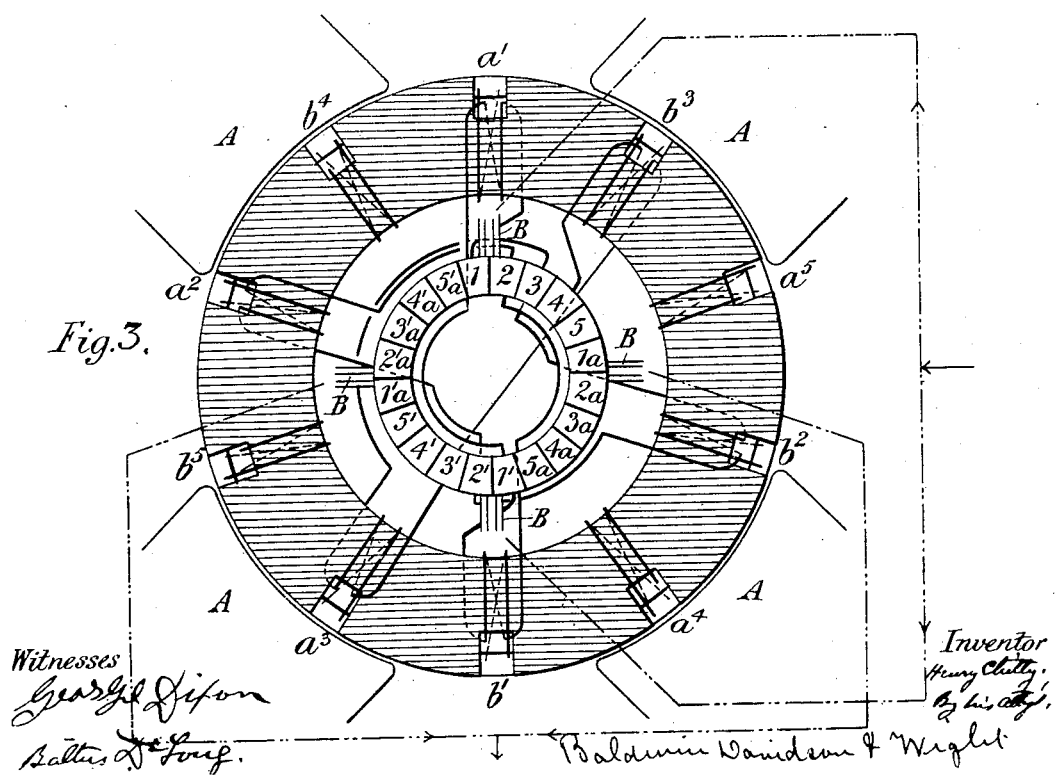

(No Model.) 4 Sheets—Sheet 3.

H. CHITTY.
ARMATURE FOR ELECTRIC MOTORS AND DYNAMO ELECTRIC MACHINES.

No. 546,996. Patented Oct. 1, 1895.

(No Model.) 4 Sheets—Sheet 4.
H. CHITTY.
ARMATURE FOR ELECTRIC MOTORS AND DYNAMO ELECTRIC MACHINES.
No. 546,996. Patented Oct. 1, 1895.

UNITED STATES PATENT OFFICE.

HENRY CHITTY, OF LONDON, ENGLAND.

ARMATURE FOR ELECTRIC MOTORS AND DYNAMO-ELECTRIC MACHINES.

SPECIFICATION forming part of Letters Patent No. 546,996, dated October 1, 1895.

Application filed July 26, 1892. Serial No. 441,234. (No model.)

*To all whom it may concern:*

Be it known that I, HENRY CHITTY, engineer, a subject of the Queen of Great Britain, residing at No. 13 Brackley Terrace, Chiswick, London, Middlesex, England, have invented certain new and useful Improvements in Electric Motors and Dynamo-Machines, of which the following is a specification.

The result aimed at in this invention is to avoid the difficulty experienced with other windings when slotted armatures separated only by a small air-space from the pole-pieces are employed, especially with regard to sparking and the short-circuiting of one part of the winding through the others owing to slight inequalities in the strength of the different field-poles. The reduction of sparking is effected by distributing the coils symmetrically over the armature-ring in "sets," the coils in each set being similarly situated with regard to different field-poles, and by causing the coils in any set to be all commutated simultaneously, by which means, each alternate coil having an opposite magnetizing effect to its neighbor, the resultant self-induction to which sparking is due is much diminished. This applies equally to the parallel and the series method of connection described. This peculiarity is not fully possessed by any other winding except the ordinary gram as applied to a multipolar-field, which is only suitable for very low tension or very large machines, since the coils under the different field-poles are connected in parallel instead of in series. This parallel connection gives rise to the second difficulty mentioned, namely, the liability of one group of coils to short-circuit through the others, especially when the air-space is made small. This is avoided by the "parallel" winding described, in which the coils of any group are distributed under the various field-poles, so that the electromotive forces are averaged. The practical outcome of this is that the winding described in a machine of small air-space permits of the magnets being made much lighter and requiring less exciting-current and sparking is reduced to a minimum.

According to this invention I construct a dynamo-electric machine of the multipolar type with an armature wound with such a number of equidistant sections that the sections may be divided up into "groups," each composed of equidistant sections, and each containing one more or one less than the number of magnet-poles. In consequence of the number of sections in a group being odd, each section will consist of two distinct coils or conductors wound in opposite directions, belonging to opposite halves of the winding, and between these the full difference of potential exists.

In the case of a single group the ends of the several coils or conductors are so connected together that the whole of the double series of coils or conductors form a closed circuit going twice around the entire armature, each successive coil or conductor being wound in the contrary direction to the one preceding.

It is generally advisable to have in combination at least as many of the before-mentioned groups as there are magnet-poles, so that the total number of sections will be the number of sections in a group multiplied by the number of magnet-poles; but any multiple or submultiple of this number of groups may be used, as hereinafter described.

When the number of groups is equal to the number of field-poles or any submultiple thereof, the corresponding sections in the several groups are sections equally spaced and similarly situated with regard to different field-poles. These corresponding sections constitute what I call a "set."

The use of an odd number of sections in a group presents the great advantage that the electromotive forces of the whole number of sections in each group are added together, as will be seen by the description hereinafter given, so that the number of turns per section is reduced to a minimum.

Figure 4:
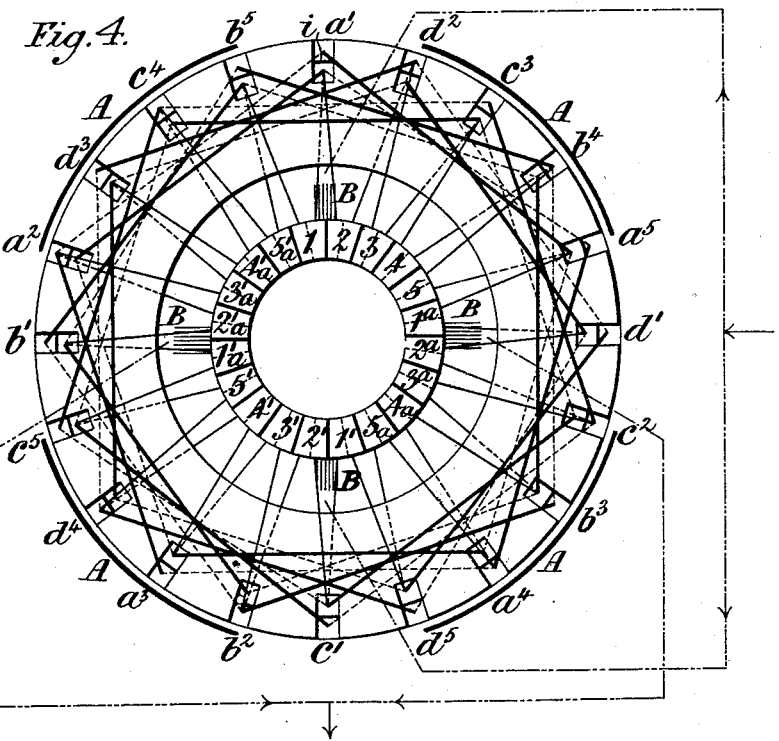
Figure 5:
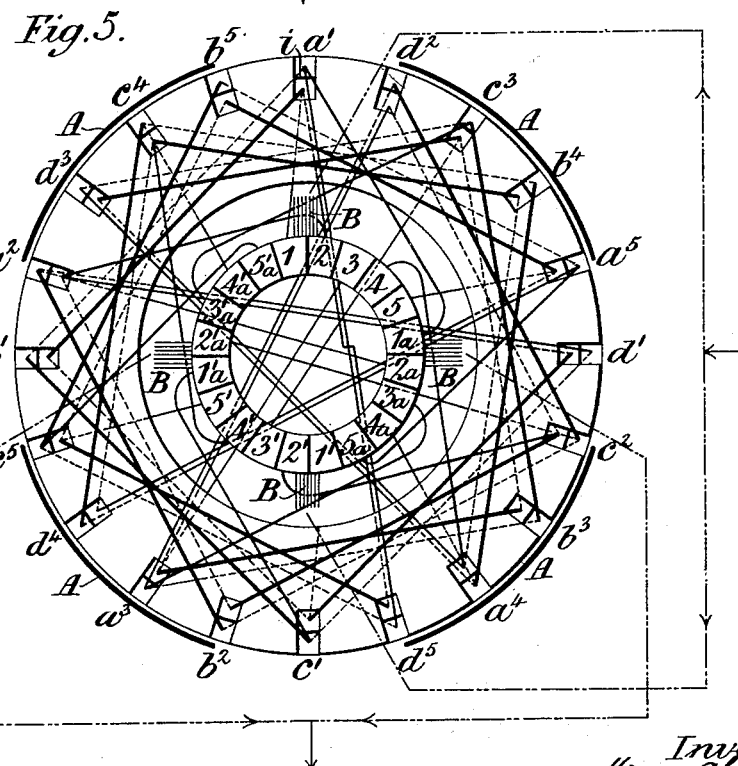
Figure 6:
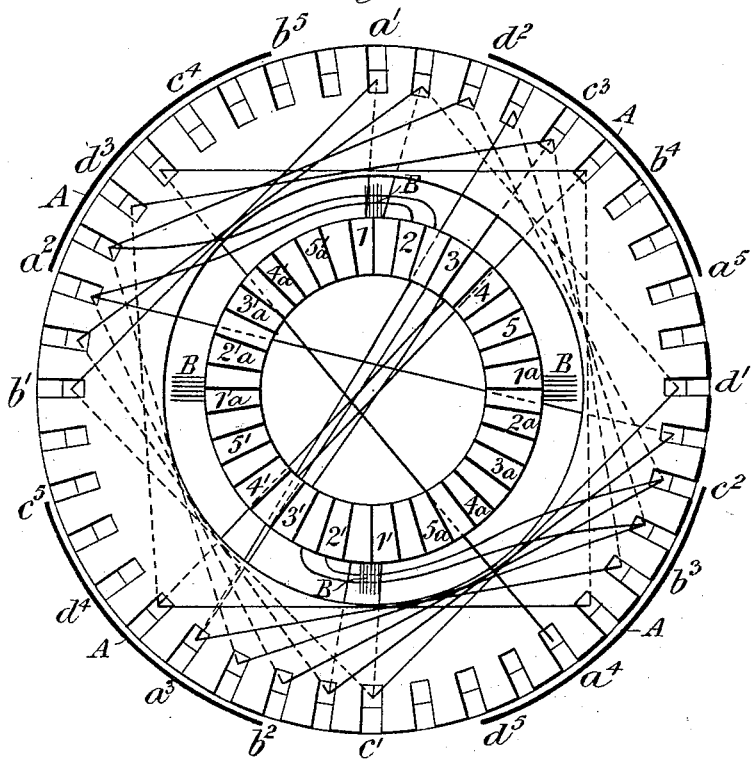
Figure 7:
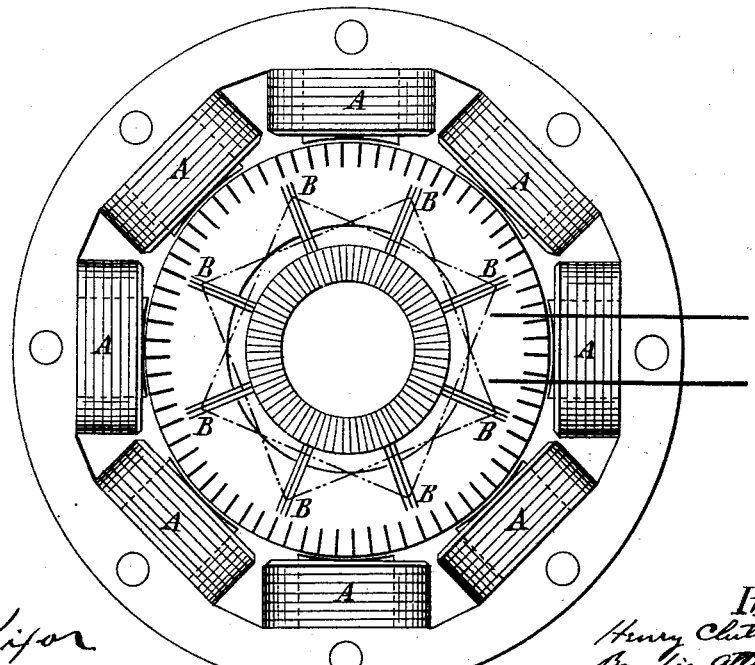

Figure 1 illustrates in a diagrammatic manner my invention applied to a machine having four field-magnet poles and an armature with one group of five sections of winding—that is, one more section than the number of magnet-poles. Fig. 2 is a diagram view showing a duplication of the winding shown in Fig. 1, with the two groups coupled in parallel. Fig. 3 is a diagram showing a similar duplication of the winding with the groups in series. Fig. 4 is a diagram view showing four groups coupled in parallel. Fig. 5 is a similar view with the four groups in series. Fig. 6 is a similar view to Fig. 5, but with eight groups. Fig. 7 is a diagram view of a machine having eight magnet-poles and seventy-two sections of winding.

The armatures represented in the drawings are of the ring or cylinder type, having slots parallel with the axis cut on the circumferential surface, and in these slots the conductors are placed. The connections between the different conductors are made at the ends of the cylinder.

In Fig. 1 $A'$ $A^2$ $A^3$ $A^4$ are four magnet-poles of alternate polarity disposed round the circumferential surface of the armature-cylinder. $a'$ $a^2$ $a^3$ $a^4$ $a^5$ are five sections of winding lying in five slots cut in the cylinder. 1 2 3 4 5, $1'$ $2'$ $3'$ $4'$ $5'$, $1^a$ $2^a$ $3^a$ $4^a$ $5^a$, and $1'^a$ $2'^a$ $3'^a$ $4'^a$ $5'^a$ are segments of the commutator. The segments or bars 1 and $1'$ are coupled together and 2 to $2'$, and so on, so also $1^a$ is coupled to $1'^a$ and $2^a$ to $2'^a$, and so on, as indicated. B $B^\times$ are brushes bearing on the surface of the commutator. As before stated, each section of winding has two distinct windings in opposite directions. The inner coils are separated from the outer coils by insulation, shown at $i$. Starting from segment 1, under the upper brush B, connection is made to the junction between section $a^5$ and $a'$ at the back of the armature, and the conductor thence proceeds to section $a'$, traversing the slot from back to front. It is then taken to section $a^2$ along the front of the armature, either directly or after being threaded through the ring, and along the slot again, as shown in Fig. 1, one or more times, as may be required. A connection having been made to segment 2 of the commutator, the conductor proceeds from front to back of the armature along slot $a^2$, which may be traversed one or more times, as described in the case of slot $a'$. From slot $a^2$ the conductor proceeds along the back of the armature to slot $a^3$, connection being also made to segment 3 of the commutator or more conveniently to segment $3'$, which is cross-connected with segment 3. Slot $a^3$ is traversed by one or more turns, as before, and so on, the connections between successive slots coming alternately at the back and front of the armature. After leaving section $a^5$ in front of the armature, the winding proceeds in the same order to section $a'$ again, but this time traverses it from front to back, connection being previously made to segment $1^a$ on the commutator. The second circuit of the armature being completed, the end of the second winding of section $a^5$ is joined to the beginning of the first winding of section $a'$, in this case, (which is by way of illustration,) from which point the start was made. The direction of the current in the various conductors is indicated by the arrows.

With the above windings and connections to the commutator-segments, the action is as follows: If B be taken as the positive brush and $B^\times$ as the negative, then in a motor current will enter by B and leave by $B^\times$, while in a dynamo it will leave by B and return by $B^\times$. Assuming the machine to be used as a motor and current to be flowing from brush B to brush $B^\times$, when one brush B is on bar 1 the other brush $B^\times$ is on $1^a$ and half-current passes, say, from B and bar 1 by inner coils $a'$ $a^2$ $a^3$ $a^4$ $a^5$ to bar $1^a$ and brush $B^\times$, and half-current by outer coils $a^5$ $a^4$ $a^3$ $a^2$ $a'$ from bar 1 to $1^a$ and brush $B^\times$, and since the inner and outer windings are in opposite directions the current passes in the same direction through the two windings of each section. When brush B is partly on bars 1 and $5'^a$ of the commutator, brush $B^\times$ is partly on bars $1^a$ and 5, and both ends of outer coil $a^5$ are in connection through bars 1 and $5'^a$ with brush B, and both ends of the inner coil are in connection through bars $1^a$ and 5 with brush $B^\times$, and no current passes through them; but current passes from brush B and bar 1 through the inner coils $a'$ $a^2$ $a^3$ $a^4$ to brush $B^\times$, and from the bar $5'^a$ through the outer coils $a^4$ $a^3$ $a^2$ $a'$ to brush $B^\times$. Although for the sake of convenience of description inner and outer coils are here spoken of, it is evident that no such distinction need be made in practice when the coils are wound separately and not as a continuous length of wire. In many cases, indeed, it is advantageous that the successive coils in the winding of a group of sections should be inner and outer coils, alternately. When bar $5'^a$ comes below brush B, current passes in one direction from B through outer coil of section $a^5$ and inner coils of $a'$ $a^2$ $a^3$ $a^4$ to brush $B^\times$, and also passes in the opposite direction through the outer coils $a^4$ $a^3$ $a^2$ $a'$ and inner coils $a^5$ to brush $B^\times$. It will thus be seen that the direction of current passing through the inner and outer coils of section $a^5$ has been changed as this section was passing between the magnet-poles $A^2$ and $A^3$. Similarly the direction of current through the coils of section $a^4$ is changed while this section is between the magnet-poles $A^3$ $A^4$, and so on.

The following table shows these changes and the other changes which take place during one-quarter of a revolution.

1. Starting with the parts in the position shown in Fig. 1, with brush B on bars 1 and 2, current passes in the directions shown by the arrows in that figure.

$\longrightarrow$ Inner coils $a^2$ $a^3$ $a^4$ $a^5$.
$\longleftarrow$ Outer coils $a^5$ $a^4$ $a^3$ $a^2$.

No current passes through $a'$, which is then between magnet-poles $A'$ $A^2$.

2. Brush B being on bar 1, current passes from this bar in the directions shown by the arrows through $\longrightarrow$ Inner coils $a'$ $a^2$ $a^3$ $a^4$ $a^5$.
$\longleftarrow$ Outer coils $a^5$ $a^4$ $a^3$ $a^2$ $a'$.

3. Brush B being on bars 1 and 5′ᵃ, current passes through $\longrightarrow$ Inner coils $a'\ a^2\ a^3\ a^4$.
$\longleftarrow$ Outer coils $a^4\ a^3\ a^2\ a'$.

No current passes through $a^5$, which is then between magnet-poles $A^2\ A^3$.

4. Brush B being on bar 5′ᵃ, current passes through $\longrightarrow$ Outer coil $a^5$, inner coils $a'\ a^2\ a^3\ a^4$.
$\longleftarrow$ Outer coils $a^4\ a^3\ a^2\ a'$, inner coil $a^5$.

5. Brush B being on bars 5′ᵃ and 4′ᵃ, current passes through $\longrightarrow$ Outer coil $a^5$, inner coils $a'\ a^2\ a^3$.
$\longleftarrow$ Outer coils $a^3\ a^2\ a'$, inner coil $a^5$.

No current passes through $a^4$, which is then between magnet-poles $A^3\ A^4$.

6. Brush B being on bar 4′ᵃ, current passes through $\longrightarrow$ Outer coils $a^4\ a^5$, inner coils $a'\ a^2\ a^3$.
$\longleftarrow$ Outer coils $a^3\ a^2\ a'$, inner coils $a^5\ a^4$.

7. Brush B being on bars 4′ᵃ and 3′ᵃ, current passes through $\longrightarrow$ Outer coils $a^4\ a^5$, inner coils $a'\ a^2$.
$\longleftarrow$ Outer coils $a'\ a^2$, inner coils $a^5\ a^4$.

No current passes through $a^3$, which is then between magnet-poles $A^4\ A'$.

8. Brush B being on bar 3′ᵃ, current passes through $\longrightarrow$ Outer coils $a^3\ a^4\ a^5$, inner coils $a'\ a^2$.
$\longleftarrow$ Outer coils $a^2\ a'$, inner coils $a^5\ a^4\ a^3$.

9. Brush B being on bars 3′ᵃ and 2′ᵃ, current passes through $\longrightarrow$ Outer coils $a^3\ a^4\ a^5$, inner coil $a'$.
$\longleftarrow$ Outer coil $a'$, inner coils $a^5\ a^4\ a^3$.

No current passes through $a^2$, which is then between magnet-poles $A'\ A^2$.

10. Brush B being on bar 2′ᵃ, current passes through $\longrightarrow$ Outer coils $a^2\ a^3\ a^4\ a^5$, inner coil $a'$.
$\longleftarrow$ Outer coil $a'$, inner coils $a^5\ a^4\ a^3\ a^2$.

11. Brush B being on bars 2′ᵃ and 1′ᵃ, current passes through $\longrightarrow$ Outer coils $a^2\ a^3\ a^4\ a^5$.
$\longleftarrow$ Inner coils $a^5\ a^4\ a^3\ a^2$.

No current passes through $a'$, which is then between magnet-poles $A^2\ A^3$.

12. Brush B being on bar 1′ᵃ, current passes through $\longrightarrow$ Outer coils $a'\ a^2\ a^3\ a^4\ a^5$.
$\longleftarrow$ Inner coils $a^5\ a^4\ a^3\ a^2\ a'$.

From the above and comparing Nos. 2 and 12 it will be seen that after a quarter of a revolution the current has been reversed in both the inner and outer coils of all the sections and that the section $a'$, which previously was approaching the magnet-pole $A^2$ and was being commutated, is now approaching the magnet-pole $A^3$, which is of opposite polarity, and is again being commutated, so that as it approaches the magnet-pole $A^3$ current will pass through its coils in the opposite direction to that in which current passed when it was approaching the magnet-pole $A^2$, as is requisite by reason of the magnet-poles being of opposite polarity. Similarly with the other segments, every segment is commutated once every quarter of a revolution when it is midway between two adjacent magnet-poles. A winding, such as shown in Fig. 1, has the objection that the current in the armature distorts the field unsymmetrically, so that the radial pull of the magnets on the armature-core is greater on one side of the axis of commutation than on the other side, which causes a severe bending stress on the shaft. This may be completely neutralized by combining two groups of windings on one armature. As before stated, there may be as many groups as there are magnet-poles, or any multiple or submultiple of this number.

Whatever the number of groups employed the corresponding sections of the several groups are equally spaced around the circumference of the armature—that is, the No. 1 sections are all equally spaced, so also the No. 2 sections, and so on, and therefore whenever any section—say No. 1 section—of any group is in a neutral field—that is, between the magnets—and is being commutated the remaining No. 1 sections of the other groups will also be in neutral fields, and will likewise be having the direction of current through them reversed.

The different groups may be connected together in parallel by joining the corresponding coils of the several groups, either in the winding or at the commutator, but the effect is just the same if brushes are placed at each of the neutral points—that is, points which are centrally between adjacent magnet-poles—and connecting those which are equipotential—i. e., each alternate brush—as shown in Figs. 2 and 4. This latter method is preferable, as it is difficult to insure equality of electromotive force in corresponding coils, while the coils in any one group being distributed around the circumference of the armature the electromotive force given by each of the several groups is necessarily equal.

In the case of the series method of connection all the corresponding coils of the several different groups are connected in succession before proceeding to the next coil of the first group—that is to say, the coils of each set are connected successively in series alternately in opposite directions, and the sets are then connected exactly as the single coils were in the single-group winding. The winding being continued a second time round, two coils are wound in opposite directions in each of the several sections of the several different groups. The end of the last coil of the last set is joined to the beginning of the first coil of the first set, so that the whole of the double series of coils or conductors form a closed circuit, alternate coils being wound in opposite directions.

Various modifications of the above winding are possible, the groups being connected in any combination of series parallel.

With the arrangement shown in Fig. 2 it will be noticed that the commutation occurs in a north field adjacent to a "north magnet-pole" and in a south field alternately and not simultaneously. This, with coils threaded through the ring, as shown, would produce an alternating induction round the ring, and so greatly increase the tendency to spark. To avoid this either the brush must cover two sections or the commutator connections must be made to the central turns of each coil instead of to the first or last.

The complete winding shown at Fig. 4, in which the total number of sections is equal to the number of sections in a group multiplied by the number of magnet-poles, obviates all these difficulties. The winding is a duplication of Fig. 2, intermediate coils being interposed between the adjacent coils constituting the two previous groups and connected to the commutator in exactly the same way, so that if each alternate section of Fig. 4 were removed the winding shown in Fig. 2 would remain. Instead of connecting the two duplicate parts of Fig. 2 to the same commutator-segment each segment may be divided into two halves, which are connected to the corresponding coils of the two duplicate parts, as shown by dotted lines in Fig. 4. In this way all permanent connection between different groups is avoided, and the groups are connected by the brushes only. All danger of short-circuiting due to difference of electromotive force in the coils under different field-poles is thus obviated. It will be noticed that by this method of connecting to the commutator the short-circuiting of the coils is accomplished by the two commutator-segments connected to the coil being joined in some cases by a single brush and in others by two equipotential brushes and their connecting-bar. There are of course other methods of connection whereby this would be modified.

Fig. 5 illustrates the complete winding in series. The course of the conductor is as follows: The windings of alternate coils are in opposite directions, as indicated by the full and dotted lines. Starting from segment 1 it passes to sections $a'$ and $b'$, segment $1'$, sections $c'$ and $d'$, then to segment 2, sections $a^2$ and $b^2$, segment $2'$, sections $c^2$ and $d^2$, then to segment 3, sections $a^3$ and $b^3$, segment $3'$, sections $c^3$ and $d^3$, and so on till all the sections are half filled. Then $d^5$ is connected to $a'$ (i. e., in this example the upper half of $a'$) and segment $1^a$; then segment $1^a$, sections $a'$ and $b'$, segment $1'^a$, sections $c'$ and $d'$, segment $2^a$, sections $a^2$ and $b^2$, segment $2'^a$, sections $c^2$ and $d^2$, segment $3^a$, sections $a^3$ and $b^3$, segment $3'^a$, sections $c^3$ and $d^3$, and so on until $d^5$ is joined to the beginning of $a'$, which completes the winding. It will be seen that in this way the short-circuiting of a set of coils—that is, a corresponding coil in each of the several groups—is effected simultaneously. The short-circuiting of any set—say $a'$ $b'$ $c'$ $d'$—can be effected by a single brush joining segments 1 and 2; but the tendency to spark is diminished by having $1'$ and $2'$ also joined by an equipotential brush, so that when being commutated 1, 2, $1'$, and $2'$ are all connected together.

In cases where it is required to have a greater number of sections than shown in Figs. 4 and 5, any multiple of that number may be used with a corresponding increase in the number of commutator-segments.

Fig. 6 shows an example of eight groups of sections.

The winding is as follows: segment 1, section $a'$ and $b'$, segment $1'$, section $c'$ and $d'$, segment 1 2, section $a'$ $d^2$ and $b'$ $a^2$, segment $1'$ $2'$, section $c'$ $b^2$ and $d'$ $c^2$, segment 2, section $a^2$ and $b^2$, segment $2'$, section $c^2$ and $d^2$, and so on. Where the number of slots in the armature is already great it may be advisable to increase the number of commutator-segments only. If, for example, the number of segments is made double the number of slots, each coil may only fill one-fourth of each slot, the other one-fourth being added after the completion of the set and connected to the next adjacent set of commutator-segments. The segments in this case will not exactly correspond with the position of the slots, being a little displaced; but if the number of slots is large the effect of this will be negligible.

Fig. 7 is a diagram view of a machine having eight magnet-poles and seventy-two sections in the armature.

What I claim is—

1. The combination of alternate magnet poles ranged in a circle equidistantly, an armature concentric therewith having such a number of sections of winding that the sections may be divided into "groups" each containing one more or one less than the number of magnet poles and each section containing two distinct coils or conductors wound in opposite directions the conductor passing or being wound in one direction in one section, then in the opposite direction in the next, and so on, until each contains two windings and the winding is complete and the ends coupled to make the whole into one closed circuit, the commutator segments, the connections from these segments to the conductor, and the brushes bearing upon the commutator in such position that the direction of current from brush to brush through each section is reversed whenever that segment crosses a neutral field.

2. The combination of alternate magnet poles ranged in a circle equidistantly and an armature concentric therewith having equally disposed in it as many "groups" of sections of winding as there are magnet poles or any multiple or submultiple of such number, and there being two windings in opposite directions in each section of the group.

3. A dynamo electric machine of the multipolar type having an armature wound with as many equally disposed "groups" of sections of winding as there are magnet poles or any multiple or submultiple of such number and commutator connections so disposed that while the direction of current in the sections in a "group" is changed successively in succeeding neutral fields, the corresponding sections of the several groups composing what is herein called a "set" (sections equally spaced and similarly situated with regard to different magnet poles) are all commutated simultaneously.

4. A dynamo electric machine of the multipolar type, having an armature wound with such a number of equidistant sections, that the several sections may be divided up into "groups" each composed of equidistant sections, and each containing one more, or one less, than the number of magnet poles, the sections in a "group" each containing two distinct coils or conductors wound in opposite directions, the ends of the several coils, or conductors being connected together, (either directly or after connection successively with the corresponding coils, or conductors, of the several other "groups," alternately in opposite directions), so that, the whole of the double series of coils, or conductors, form a closed circuit, alternate coils being wound in opposite directions, substantially as described.

HENRY CHITTY.

Witnesses:
WALTER J. SKERTEN,
W. J. NORWOOD.